US010242235B2

(12) United States Patent
Chiarella et al.

(10) Patent No.: US 10,242,235 B2
(45) Date of Patent: Mar. 26, 2019

(54) AUTHENTICATION OF A SMART PEN AND COMPUTING DEVICE

(71) Applicant: INTERNATIONAL BUSINESS MACHINES CORPORATION, Armonk, NY (US)

(72) Inventors: Giacomo G. Chiarella, Eastleigh (GB); Shayan Z. Dolab, Hursley (GB); Deborah L. Fielder, Hampshire (GB); Eunjin Lee, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

(21) Appl. No.: 15/277,107

(22) Filed: Sep. 27, 2016

(65) Prior Publication Data
US 2018/0089470 A1 Mar. 29, 2018

(51) Int. Cl.
| G06F 21/44 | (2013.01) |
| G06F 21/83 | (2013.01) |
| G06F 21/35 | (2013.01) |
| G06F 21/34 | (2013.01) |
| G06F 21/36 | (2013.01) |
| G06F 21/32 | (2013.01) |

(52) U.S. Cl.
CPC .............. *G06F 21/83* (2013.01); *G06F 21/32* (2013.01); *G06F 21/34* (2013.01); *G06F 21/35* (2013.01); *G06F 21/36* (2013.01); *G06F 21/445* (2013.01)

(58) Field of Classification Search
None
See application file for complete search history.

(56) References Cited

U.S. PATENT DOCUMENTS

| 9,164,599 | B2 | 10/2015 | Dowd et al. | |
| 2005/0033703 | A1* | 2/2005 | Holdsworth | ............ G06F 21/34 |
| | | | | 705/67 |
| 2014/0281946 | A1* | 9/2014 | Avni | ...................... G06T 1/0021 |
| | | | | 715/268 |

(Continued)

OTHER PUBLICATIONS

Chiarella et al., "Authentication of a Smart Pen and Computing Device", U.S. Appl. No. 15/794,138, filed Oct. 26, 2017, (49 pages).

(Continued)

*Primary Examiner* — Joseph P Hirl
*Assistant Examiner* — Hassan Saadoun
(74) *Attorney, Agent, or Firm* — Steven Meyers, Esq.; Kevin P. Radigan, Esq.; Heslin Rothenberg Farley & Mesiti P.C.

(57) ABSTRACT

Method and system are provided for authentication for pairing of a smart pen with a computing device. The method, which is carried out at a smart pen, may include: sensing a signature event carried out by a user writing with the smart pen on an input user interface of the computing device; recording a signature resulting from the signature event; authenticating the signature by comparing to a stored previously recorded signature at the smart pen. If the authenticating is successful, the method activates connection of the smart pen with the computing device using a communication channel. A corresponding method is carried out at the computing device at which the signature event is carried out.

16 Claims, 8 Drawing Sheets

(56) References Cited

U.S. PATENT DOCUMENTS

2016/0065301 A1 3/2016 Kukulski et al.
2016/0117515 A1* 4/2016 Black .................. G06F 21/6218
726/4

OTHER PUBLICATIONS

Chiarella et al., "List of IBM Patents or Patent Applications Treated as Related", U.S. Appl. No. 15/277,107, filed Sep. 27, 2016, dated Oct. 26, 2017 (2 pages).

* cited by examiner

AUTHENTICATION OF A SMART PEN AND COMPUTING DEVICE

BACKGROUND

The present invention relates to authentication of a smart pen and a computing device, and more specifically, to authentication of such devices before pairing.

Smart pens are defined as pens that include an embedded processor and sensor functionality. Smart pens may be used as traditional pens to write on paper while synchronizing with a computing device to transfer input data of written notes to the computing device. Other forms of smart pens may require a dedicated smart pad that records the handwriting that may be communicated concurrently or at a later time to a computing device.

When using smart pens it is important that their use is dynamic and that the user does not experience any considerable delays when compared to traditional pen and paper. Currently a smart pen is connected to a device by a communication channel, such as Bluetooth or Wi-Fi.

Connecting to a Bluetooth communication channel can be very time consuming. For example, a user may have to unlock their device, turn Bluetooth on, search for Bluetooth devices, select the smart pen, and input a password to connect to that device.

Smart pens may use Wi-Fi as a communication channel to authenticate and connect to devices. Such devices may only connect to other devices in the same local area network (LAN) if authentication between the devices has been previously established. However, accessible Wi-Fi networks are not always available.

An authentication of a smart pen and a computing device may take place once a connection has been established between the smart pen and the computing device, for example, by exchanging codes or identifiers. This may lead to snooping on a connection by an unscrupulous third party.

Therefore, there is a need in the art to address the aforementioned problems

SUMMARY

According to an aspect of the present invention there is provided a computer-implemented method carried out at a smart pen for authentication for pairing with a computing device, comprising: sensing a signature event carried out by a user writing with the smart pen on an input user interface of the computing device; recording a signature resulting from the signature event; authenticating the signature by comparing the signature to a stored previously recorded signature at the smart pen; and wherein, based on the authenticating being successful, activating connection of the smart pen with the computing device using a communication channel.

The described aspects of the invention provide the advantage of providing authentication of a user of a smart pen before the smart pen is connected to a computing device. A single event may authenticate the user at both the smart pen and the computing device and then establish a connection and pair the smart pen and the computing device.

The method may also include, once connection is activated, carrying out a pairing procedure including exchanging signature data relating to the signature event and establishing pairing of the smart pen and the computing device if the exchanged signature data corresponds.

Exchanging signature data provides further verification that the correct smart pen and the computing device are establishing pairing.

Recording the signature may record metadata of the signature including static signing characteristics and/or dynamic signing characteristics and authenticating the signature may compare the metadata to stored metadata of a previously recorded signature.

Activating connection may include one or more of: unlocking the smart pen, switching on a communication channel at the smart pen, and locating a reference to the computing device's communication channel.

Exchanging signature data may send first signature data derived from the signature event to the computing device and may receive second signature data from the computing device, and wherein the method may further include comparing the first and second signature data to ensure they relate to a single signature event. The first signature data may include a timestamp of the signature event at the smart pen and the second signature data may include a timestamp of the signature event at the computing device, and comparing the first and second signature data may verify or ensure the timestamps are within a defined time period. The first signature data may include an image of the signature or may include data derived from metadata of the signature.

This method may also include a registration process for recording and storing a signature at the smart pen carried out by a user writing with the smart pen on the input user interface of the computing device.

Authenticating the signature by comparing to a stored previously recorded signature at the smart pen may substantially match the signature to one of a plurality of stored signatures for different computing devices and/or different users of the smart pen. The method may include receiving a second signature event and carrying out the defined method to change a connection to a second computing device.

The signature event may sign a graphic input of the user in the form of one or a combination of the group of: a name, a word, a phase, a string of characters, and a drawn graphic.

According to another aspect of the present invention there is provided a computer-implemented method carried out at a computing device for authentication for pairing with a smart pen, comprising: receiving a signature event carried out by a user writing with the smart pen on an input user interface of the computing device; recording a signature resulting from the signature event; authenticating the signature by comparing the signature to a stored previously recorded signature at the computing device; and wherein, if the authenticating is successful, activating connection of the computing device with the smart pen using a communication channel.

The method may include, once connection is activated, carrying out a pairing procedure including exchanging signature data relating to the signature event and establishing pairing of the smart pen and the computing device if the exchanged signature data corresponds.

Recording the signature may record metadata of the signature including static signing characteristics and/or dynamic signing characteristics and authenticating the signature may compare the metadata to stored metadata of a previously recorded signature.

Activating connection may include one or more of: unlocking the computing device, switching on a communication channel at the computing device, and locating a reference to the smart pen's communication channel.

Exchanging signature data may send second signature data derived from the signature event to the smart pen and may receive first signature data from the smart pen, and wherein the method includes comparing the first and second signature data to ensure they relate to a single signature event.

The first signature data may include a timestamp of the signature event at the smart pen and the second signature data may include a timestamp of the signature event at the computing device, and comparing the first and second signature data may ensure the timestamps are within a defined time period. The first signature data may include an image of the signature or data derived from metadata of the signature.

The method may also include a registration process for recording and storing a signature at the computing device carried out by a user writing with the smart pen on the input user interface of the computing device.

Authenticating the signature by comparing to a stored previously recorded signature at the computing device may substantially match the signature to one of a plurality of stored signatures for different smart pens and/or different users of the smart pen. The method may include receiving a second signature event and carrying out the defined method to change a connection to a second smart pen The signature event may sign a graphic input of the user in the form of one or a combination of the group of: a name, a word, a phrase, a string of characters, and a drawn graphic.

A smart pen for authentication for paring with a computing device, as well as a computing device for authentication for pairing with a smart pen, relating to one or more aspects, are also described and claimed herein. In addition, a computer program product carried out at a smart pen for authentication for pairing with a computing device, and a computer program product carried out at a computing device for authentication for pairing with a smart pen, relating to one or more aspects, are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention are described below, by way of example only, with reference to the drawings, in which.

Figure 1:
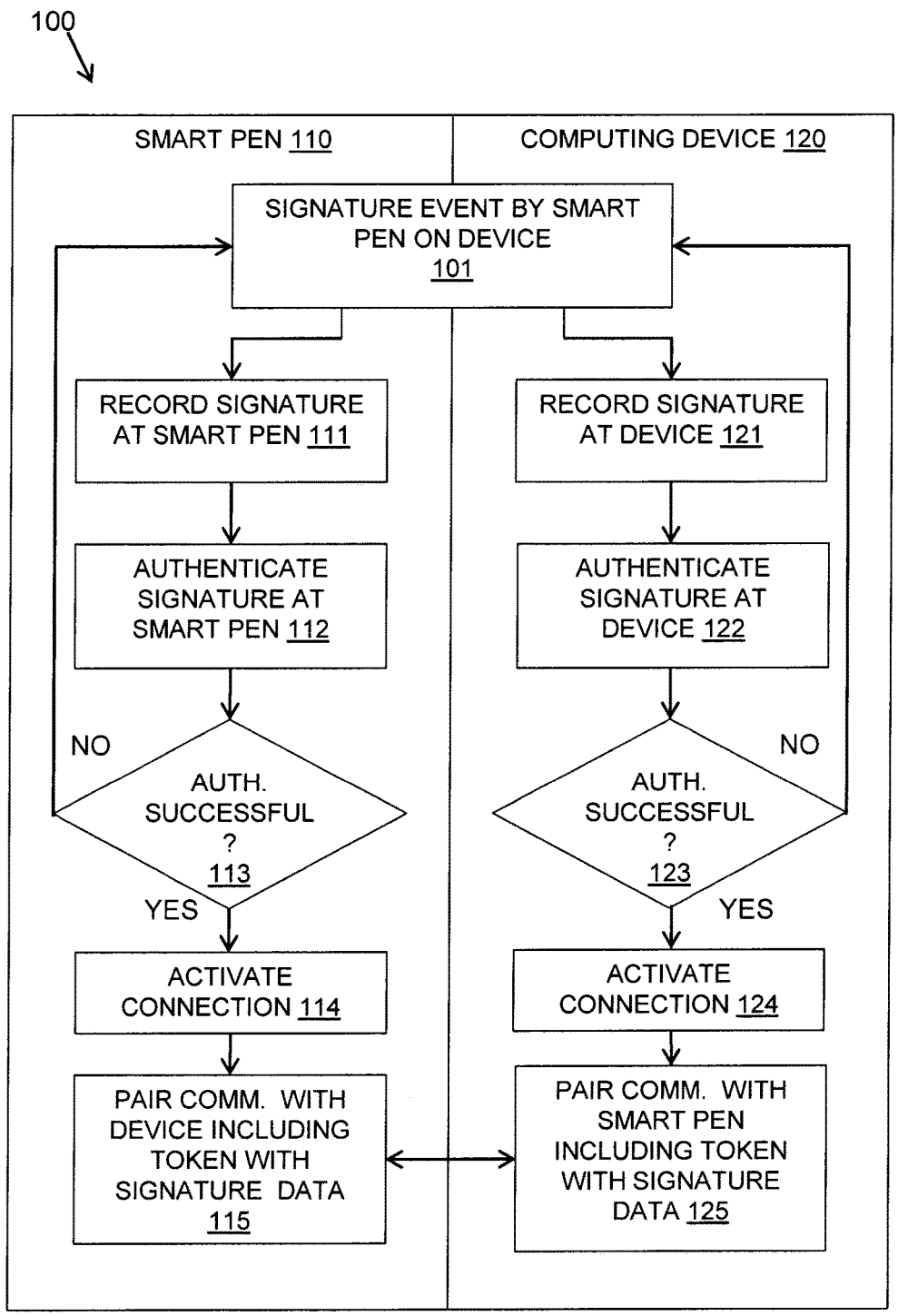
FIG. 1 is a swim-lane type flow diagram of an example embodiment of a method, in accordance with one or more aspects of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described methods and systems use a smart pen to sign on an input user interface of a target computing device to provide a single signature event which may be authenticated at each of the smart pen and computing device prior to connection of the smart pen and the computing device. Once the signature event has been authenticated at each device a connection and pairing of the devices may be carried out.

Both the smart pen and the computing device are required to recognize the user's signature in order to authorize the pairing. The connection and pairing may then be initiated automatically. Optionally, additional verification of the signature event may be carried out by exchanging signature data as part of the pairing process.

This method may require a short initial registration and will then greatly speed up authentication and the pairing process for subsequent pairing of the same devices whilst maintaining security.

The term "connection" is used to refer to communication of devices prior to pairing where the two devices may communicate to provide some information about the devices but have not yet been fully paired. The term "pairing" is used herein to define a communication established between two specific devices using a communication channel for the transfer of data. Pairing may require an exchange of codes or identifiers of the two devices or a handshake procedure. Pairing may establish a secure communication between the two devices, for example, including encryption of transmitted data. Pairing may also refer to subsequent connection of paired devices when the connection has been interrupted. Such subsequent connection may be more straightforward as codes may not need to be re-exchanged to recognize the pairing relationship.

The communication channel between the smart pen and the computing device may be any suitable wireless communication including Bluetooth, WiFi, Infrared, Radio-frequency identification (RFID), and Visual Light Communication. In an alternative embodiment, the communication channel may be a wired connection, for example, if the smart pen is connected to a USB port of the computing device, for charging as well as communication of data.

The smart pen may be used in conjunction with a computing device in the form of a touchscreen device that enables the user to sign using the smart pen on the touchscreen user interface of the computing device. Automatic authenticating and initializing of pairing may be carried out between the touchscreen device and the smart pen using a single signature where the signature is penned by a user using the smart pen on the touchscreen device.

In an alternative embodiment, a non-touchscreen computing device may use an input user interface in the form of a signature receiving device such as a signature pad or graphics tablet which may be connected to the computing device, for example as a universal serial bus (USB) attachment. The term computing device is used which includes a touchscreen device or non-touchscreen device with an auxiliary signature receiving device.

Both the smart pen and the computing device may record the signature penned by the user as a registered default signature. The signature may be any form of graphic input by the user; for example, a classic signature signing a user's name, a signed password, phrase or string of characters or numerals, a drawn graphic, or a combination of any of these inputs. The term "signature" is defined to include all these forms of graphic input.

The signature may be recorded as the image of the signature and/or as characteristics of the signature such as the flow, speed, pressure, and style of the user input.

The registered relationship may be a three-way relationship between the user, the smart pen, and the computing device. The smart pen may identify which computing device to connect to depending on the signature penned. The smart pen and/or the computing device may also recognize the user based on the penned signature.

The method may include automatically activating or turning-on a communication channel of both the computing device and the smart pen device and pairing them, after the signature has been authenticated at both the computing device and the smart pen. The authentication happens at each device before the devices are paired or connected and removes a significant effort of the user to pair the devices by removing the need for the user to command each device individually to pair with each other. In a specific example, a user may sign with a smart pen on a tablet screen and both the tablet and the smart pen may authenticate the signature, and only after this authentication will they turn on their Bluetooth to pair with each other.

The method may also allow connection of locked smart pens and devices. A computing device such as a tablet might be locked when the user carries out the signature, but authenticating this signature may unlock the tablet and connect it to the smart pen. A smart pen may also be locked and using it to write a signature may unlock the smart pen.

Monitoring a single action in the form of the signature at the same time on both the smart pen and the computing device and authenticating the signature independently allows the user to authenticate and connect both devices with a single command.

During an initial use of a smart pen at a computing device, the signature may be registered and recorded for future use. For re-pairing the smart pen in future with the computing device or another previously used computing device, the method authenticates the signature by comparing the signature with the previously recorded and stored signature.

The smart pen and the computing device may make sure they are pairing with the correct counterpart by exchanging tokens over the communication channel during the pairing process.

The method speeds up the pairing process significantly as users only need to sign with their smart pen on any touch-enabled computing device and that will be sufficient to authenticate and connect the two devices. This can be very convenient when switching between multiple touch-enabled devices (for example, when controlling both a tablet and a computer with the same smart pen).

Furthermore, the authentication step before connection adds an extra layer of security, as it makes sure the user of the smart pen is the same as the user of the computing device, and there are no unwanted connections in a room which may have multiple smart pens.

An advantage of this method is that the connection starts after the authentication step. Both devices perform authentication before they are connected and independently of each other. The advantage of this is that it decreases the chance of someone being in the middle, snooping on the connection to unlock one of the devices. The token exchange during pairing is an additional verification.

Referring to FIG. 1, a swim-lane type flow diagram 100 shows one embodiment of a method at both a smart pen 110 and a computing device 120, in accordance with one or more aspects of the present invention.

A signature event may be carried out 101 by the smart pen 110 on an input user interface of the computing device 120. The input user interface may be either a touchscreen of the computing device or an auxiliary input device connected to the computing device.

The smart pen 110 may record 111 the signature as it is input in the signature event. The signature record at the smart pen may include static characteristics such as an image of the signature as captured or interpreted by the smart pen during input, for example, as captured by an optics sensor. The signature record at the smart pen may also include dynamic characteristics of the input such as speed, flow, pressure, style, etc. which may be captured and measured by an internal accelerometer, gyroscope and pressure sensors of the smart pen. The dynamic characteristic measurements and data may be analyzed and interpreted by software functionality of the smart pen.

The computing device 120 may record 121 the signature as it is received in the signature event. The signature record at the device may also include an image of the signature and dynamic characteristics of the input such as speed, flow, pressure, style, etc. The touchscreen functionality may detect the image as well as dynamic characteristics determined by the speed and acceleration and therefore the flow of the signature. The pressure may be measured with a pressure-sensitive screen that recent touchscreen devices have built in.

The recorded signature may be authenticated 112, 122 independently at each of the smart pen 110 and the computing device 120. If this is a first use of the smart pen 110 with the computing device 120, this may include a registration process for the signature at both the smart pen 110 and the computing device 120.

The authentication 112, 122 at each of the smart pen and the computing device 120 may compare a currently recorded signature in the form of metadata of the static and/or dynamic characteristics of the signature with the same metadata of the stored recorded signatures at each device. The term metadata is used to refer to any data derived or analyzed from the signature characteristics including the characteristics themselves such as the recorded signature image.

If this is a subsequent use of the smart pen 110 at the computing device 120, the authentication 112, 122 may involve looking up a recorded signature including its associated dynamic characteristics for comparison with the input signature. Methods to match signatures to stored signatures may use image recognition and/or may compare dynamic characteristics to analyze the similarity of two signatures. Dynamic characteristics or information may be based on time t and include: spatial coordinates x(t) and y(t), pressure p(t), azimuth az(t), inclination in(t), and pen up/down.

It may be determined 113, 123 at each of the smart pen 110 and the computing device 120, if the authentication 112, 122 is successful. If in either case, it is not successful, then the method may loop to re-enter the signature 101 and may provide appropriate alerts or notifications to the user.

If the authentication 112, 122 is successful, then a connection activation 114, 124 may be carried out at each of the smart pen 110 and computing device 120. The connection activation 114 at the smart pen may include optionally unlocking the smart pen 110, activating the communication channel, if it is not already active, and identifying the computing device 120. The connection activation 124 at the computing device 120 may include optionally unlocking the computing device, activating the communication channel, if it is not already active, and identifying the smart pen 110.

A pairing procedure 115, 125 between the smart pen 110 and the computing device 120 may then be carried out. The pairing procedure 115, 125 may include exchanging a token that may be based on signature data of the signature event 101 to further verify the correct devices are pairing. The signature data may be an image or metadata of the signature and/or a timestamp of the signature event to further verify the signature event 101. For example, after the smart pen 110 and the device 124 connect, they may exchange a token that contains the timestamp of when each signature was received at that device. If the tokens match, the pairing process may complete. If the tokens do not match, the pairing process may be terminated.

Figure 2A:
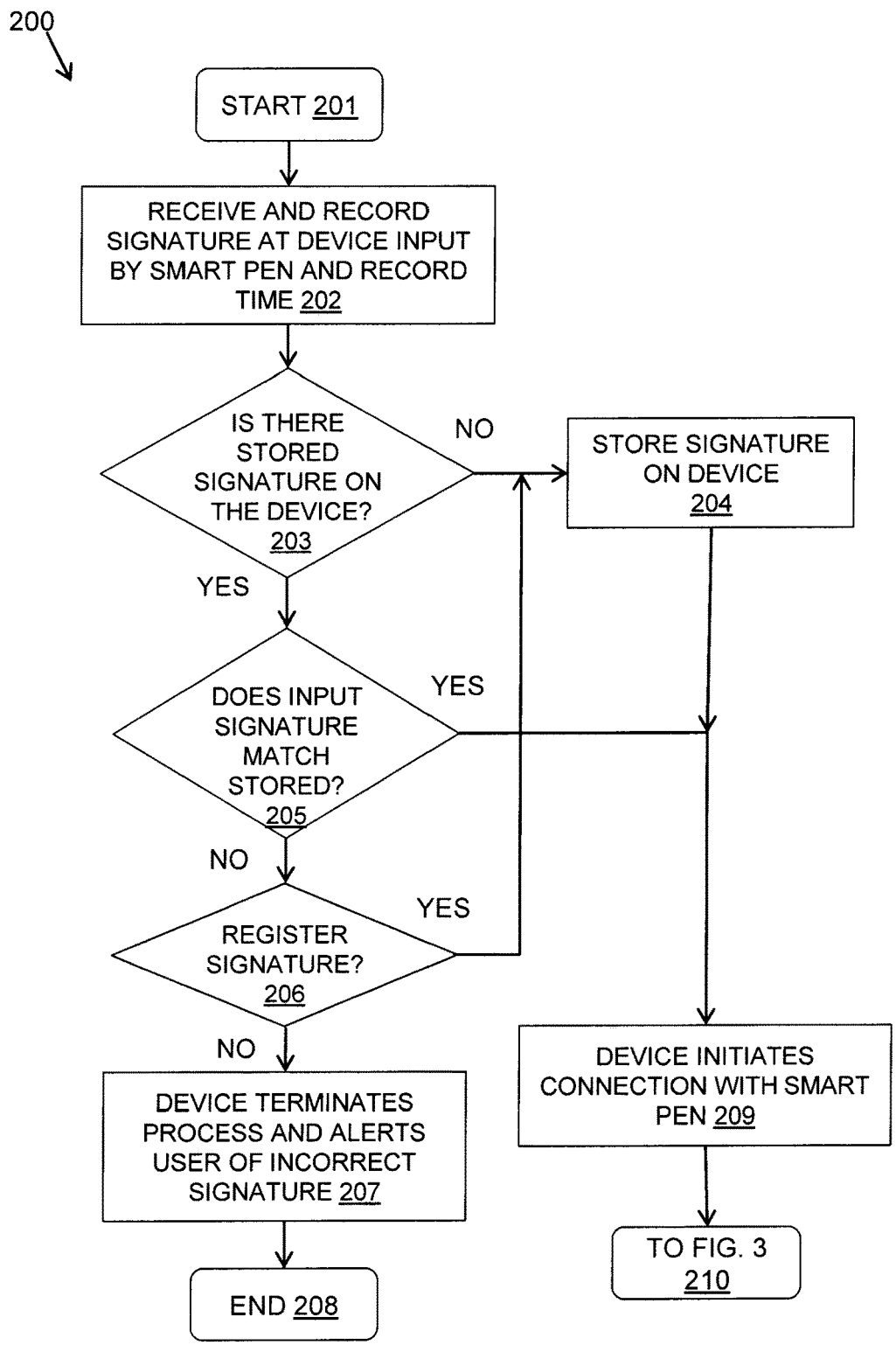
FIG. 2A is a flow diagram of one embodiment of a process executed at a computing device, in accordance with one or more aspects of the present invention.
Figure 2B:
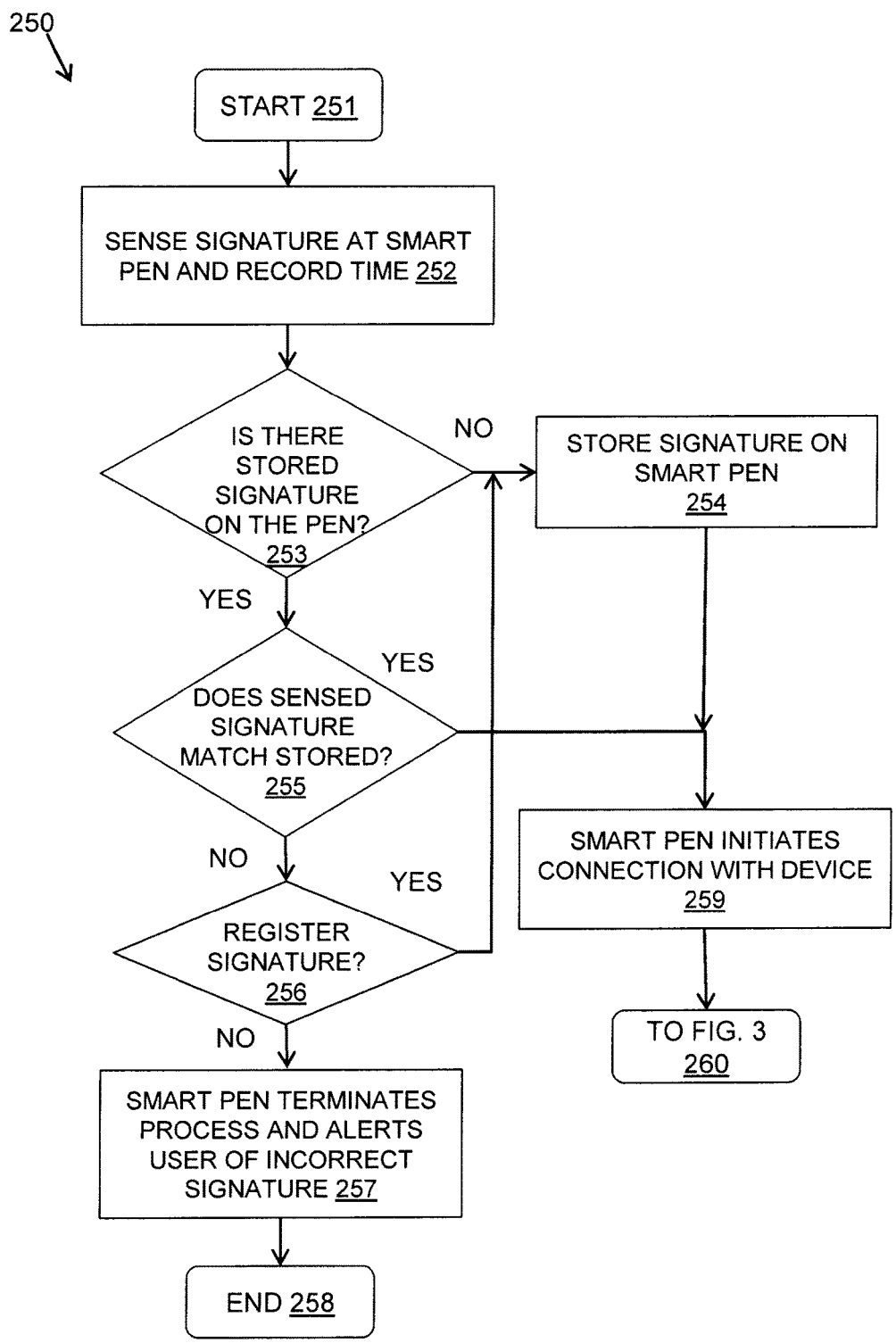
FIG. 2B is a flow diagram of one embodiment of a process executed at a smart pen, in accordance with one or more aspects of the present invention.

FIGS. 2A and 2B are flow diagrams 200, 250 of one embodiment of a method as carried out at a computing device and smart pen, respectively, in accordance with one or more aspects of the present invention. The smart pen may be supplied with programmed functionality to record and authenticate a signature made with the smart pen and communication pairing functionality for pairing to a computing device. The computing device may require computer instructions to be installed on the computing device, for example in the form of an application provided by a smart pen provider, providing the functionality required by the computing device for interacting with the smart pen.

Referring to FIG. 2A, a method at the computing device may start 201 and may receive 202 and record a signature received at an input user interface at the computing device input by a user using the smart pen.

It may be determined 203, if there is a stored signature on the computing device. If there is no signature stored on the computing device, the user may be taken through a registration process and the signature may be stored 204 on the computing device. This may involve the user providing further authentication and the smart pen being identified against the recorded signature. The method may then proceed to initiate connection 209 with the smart pen. The method may then proceed 210 to the method of FIG. 3 described below.

If it is determined 203 that there are one or more signatures stored on the computing device, it may then be determined 205 if the received signature substantially matches a stored signature. If the received signature substantially matches a stored signature, then the computing device may initiate connection 209 with the smart pen. The method may then proceed 210 to the method of FIG. 3 described below.

If the received signature does not substantially match a stored signature, then it may be determined 206 if the signature is incorrect, or if it should be registered as a new signature and may allow the user to re-enter the signature. This may involve notifying the user that an unmatched signature has been entered and may provide an option to register a new signature. If the signature is to be registered, the user may be taken through a registration process and the signature may be stored 204 on the computing device. The computing device may initiate connection 209 with the smart pen and the method may then proceed 210 to the method of FIG. 3 described below.

If the signature is not to be registered, then the computing device may terminate 207 the process and alert the user of an incorrect signature. The method may then end 208.

Matching signatures may use known method of pattern or data matching within threshold parameters. Data may be extracted or generated from the signatures in the form of metadata which may be used for the matching process.

In one embodiment, there may be multiple signatures stored on the computing device, for example in a scenario where a computing device is shared and multiple users use their own smart pens, or a single user has two different smart pens. The computing device may store a record of the multiple different signatures and may match a received signature.

A stored signature on the computing device may include details of the smart pen's name to be found during pairing and/or a communication protocol used by the smart pen registered against the signature. This may increase security. However, if a user wishes to pair a new smart pen using the same signature this may require overwriting.

Referring to FIG. 2B, a method at the smart pen (in accordance with one or more aspects of the present invention) may start 251 and may sense 252 and record a signature at the smart pen as input by the user of the smart pen at a computing device.

It may be determined 253, if there is a stored signature on the smart pen. If there is no signature stored on the smart pen, then the user may be taken through a registration process and the signature may be stored 254 on the smart pen. This may involve the user providing further authentication and the computing device being identified against the recorded signature. The method may then proceed to initiate connection 259 with the computing device. The method may then proceed 260 to the method of FIG. 3 described below.

If it is determined 253 that there are one or more signatures stored on the smart pen, it may then be determined 255 if the received signature substantially matches a stored signature. If the received signature substantially matches a stored signature, the smart pen may initiate connection 259 with the computing device. The method may then proceed 260 to the method of FIG. 3 described below.

If the received signature does not substantially match a stored signature, it may be determined 256 if the signature is incorrect or if it should be registered as a new signature. This may involve notifying the user that an unmatched signature has been entered and may allow the user to re-enter the signature. If the signature is to be registered, the user may be taken through a registration process and the signature may be stored 254 on the computing device. The smart pen may initiate connection 259 with the computing device and the method may then proceed 260 to the method of FIG. 3 described below.

If the signature is not to be registered, then the smart pen may terminate 257 the process and alert the user of an incorrect signature. The method may then end 258.

In the scenario where the smart pen is used with multiple computing devices, a single signature may be stored for connection to any of the computing devices which have the signature stored. In an alternative embodiment, a different signature may be used for each computing device and each stored signature at the smart pen may reference the correct computing device and optionally any preferred communication protocol used by the computing device registered against the signature.

In a further embodiment, the user may have a smart pen with a stored signature and a backup computer also has the stored signature. These devices may never have been connected or paired before; however, the described method allows them to connect and pair by authenticating both devices using the signature. In this embodiment, the registration of the stored signature on the backup computer may be provided by the transfer of a data file instead of signing at the backup computer with the smart pen.

Figure 3:
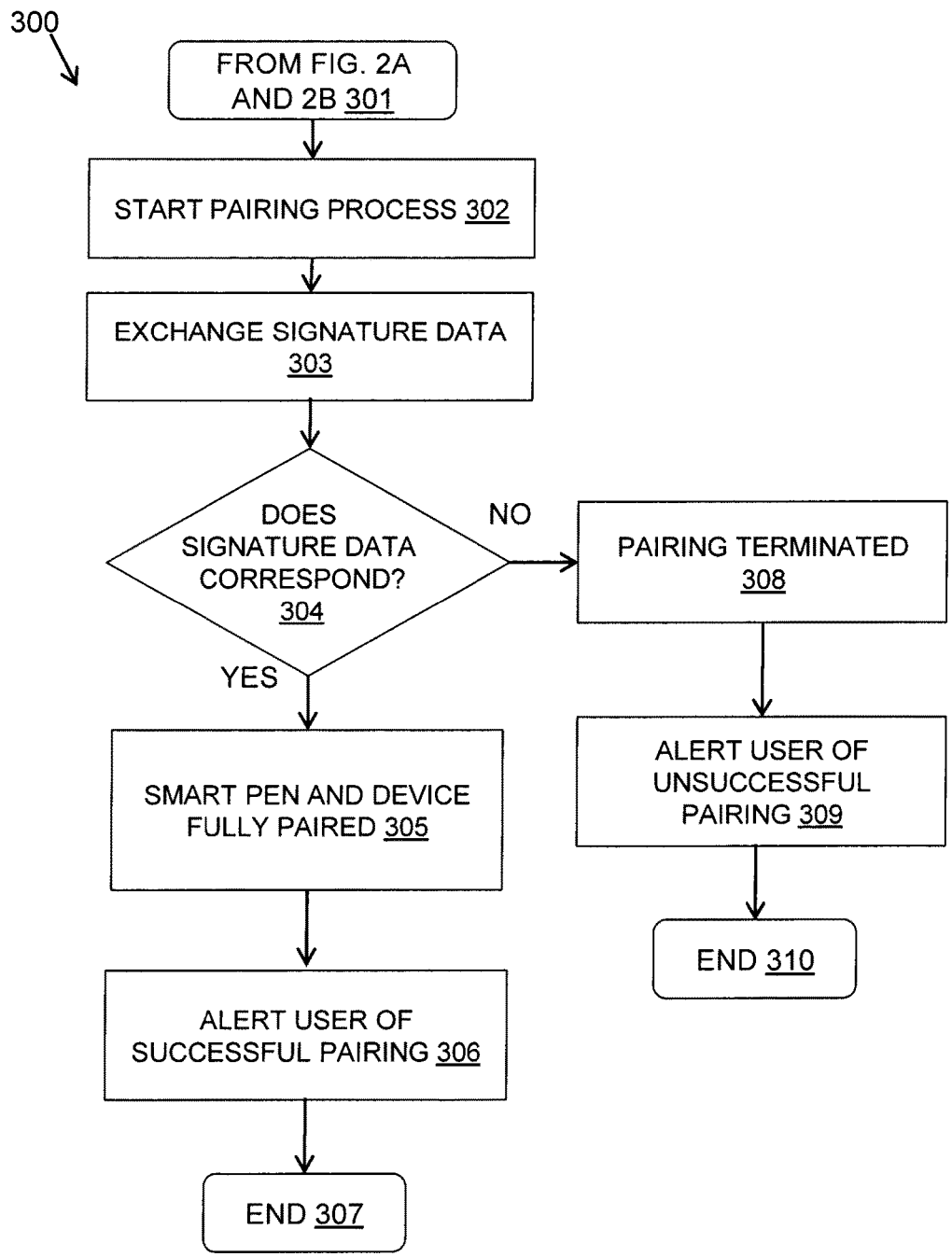
FIG. 3 is a flow diagram of one embodiment of further processing, in accordance with one or more aspects of the present invention.

Referring to FIG. 3, a flow diagram 300 shows an example embodiment of the further aspect of the described method of a pairing process between a smart pen and a computing device following from the methods of FIGS. 2A and 2B 301.

A pairing process for a communication protocol of a communication channel may be started 302. The communication protocol may be for communication channels in the form of Bluetooth, WiFi, Infrared, NFC, RFID or Visual Light Communication. This may include the smart pen and computing device turning on their communication channel capability, if not already on, and looking for the other device. If the pairing process is being carried out for the first time between two devices, then the process may involve exchange of codes or identification.

The smart pen and the computing device may exchange 303 signature data of the signature event. For example, this may be an image, metadata or derived data of the signature received/input during the signature event. In one example, this may include a derived alpha-numerical value of the signature event. In another example, the signature data may be a timestamp of the received/input signature either alone or in combination with other signature data.

It may be determined 304 if the exchanged signature data corresponds. This may not be an exchange of identical data, but may be corresponding data such as an input flow of the smart pen signature that corresponds to a received input at the computing device.

If the signature data corresponds, the smart pen and the computing device may complete the pairing process and become fully paired enabling full functionality of the smart pen. An alert may be sent to the user via one or both the smart pen and the computing device indicating the successful pairing. The method may then end 307.

If the signature data does not correspond, the pairing process between the smart pen and the computing device may be terminated 308. This may be terminated by one or both the smart pen and the computing device depending on which device identifies that the signature data does not correspond. If only one of the devices considers the signature data to not correspond, that device will terminate the pairing process. An alert may be sent to the user via one or both the smart pen and the computing device indicating an unsuccessful pairing 309 and the method may end 310.

The method may include additional functionality for replacing an existing signature or adding a second signature for a combination of smart pen and computing device.

In the case where the user wants to use one signature across two computing devices, when the user wishes to switch between two devices, the user may sign on the second computing device. The second computing device and the smart pen may simultaneously detect that the signature has been penned. This signature action may trigger the connection procedure. After the tokens are exchanged and the pairing is completed, the smart pen may disconnect its connection with the first computing device.

In the case where the user wants to use different signatures for different computing devices, the connection procedure may happen in the same way as described above, but from the user's perspective, it will appear that there is a separate process to pair with the second computing device. This second signature may be compared to the stored signature on the second computing device as before.

To summarize, a smart pen and a computing device may each recognize that a signature has been entered and may each authenticate a user if the signature exists in the respective device. If no signature exists, then it may be registered and stored as an authentic signature. In response to the recognition of the signature, each device starts a connection and a pairing may be carried out containing information about the signature, and if the two match, then the devices are paired. Both devices are able to process the same signature at the same time independently to start a communication if they match their stored signatures.

Working Example:

The case is considered where User 1 buys a smart pen and wants to use it with his touchscreen device, and in this example, a tablet. To initiate the first ever pairing of the two devices, the user signs with the pen on the tablet screen. Both devices recognize that a signature has been executed. The tablet is able to do this as the user has previously downloaded an application for the smart pen that includes the software needed for using the smart pen. However, because this is the first instance of pairing, User 1 also needs to authorize the signature he just used and save it as his signature on the tablet.

The pre-loaded smart pen software on the tablet asks for the tablet's administrator password as authentication to store the signature used by User 1. At the same time, the smart pen knows this is the first time it is being used (either as it comes with factory settings or because there is no stored signature) so it automatically stores this first signature as the default authentication signature.

The input of this first signature also triggers a connection and pairing process on both devices. The tablet turns its Bluetooth on and starts looking for a smart pen. It will also transmit an authentication signal through the Bluetooth unique to that signature, either by sending a picture or by assigning an alpha numerical value to the signature. The smart pen does the same; it turns its Bluetooth on and starts looking another Bluetooth device. It will only pair with the device that has the same signature data. This can be done by both devices comparing the pictures of the signature that were input or by comparing the alpha numerical value that was assigned to the signature. Only if both sets of data match, and therefore both devices know the same signature was done using the two devices, will the smart pen and the touchscreen device fully pair.

User 1 has now paired his tablet with his new smart pen. If User 1 turns his tablet and his pen Bluetooth off to save battery (as it is often done), to reconnect and repair the two devices he just needs to sign on the screen of the tablet again with the smart pen. This time the process is faster because the signature has already been stored, so the smart pen and the tablet only need to turn Bluetooth on, compare signature data, and pair which is all carried out with a single command.

User 1 may then buy a laptop, which he also pairs with his smart pen. One day, he wants to pair his tablet again with the smart pen having been using the smart pen with the laptop in the intervening period. Using a conventional method, the user would have to disconnect the laptop and the smart pen and then reconnect the smart pen with the tablet; however, using the described method the user only needs to sign on the tablet touchscreen to pair, since both devices authenticate the signature, identify the other device with the same signature data, and pair with each other. The smart pen pairs with the tablet and not the laptop because the tablet Bluetooth signal is the only one that contains the correct signature and time data. User 1 can revert to connection to the laptop by signing on the laptop screen.

Different devices may use different signatures, for example of different passwords, or may use a single signature with a timestamp.

If User 2 comes along, picks up User's 1 smart pen and tries to turn it on by signing on User's 1 tablet, the devices will not pair because User 2's signature does not match User's 1 signature that is stored as the authentication signature. This way people in the same working area cannot control User 1's device by just picking up the smart pen without knowing his signature.

The described method uses a single physical command of the user, in this case the signature, for both devices to establish authentication and to pair with each other.

This single command also allows both devices to automatically know which device they need to pair with, because the inputted command was identical and simultaneous on both devices. The devices may use the time of signature to authenticate as an extra layer of security, since both times should be approximately the same. This allows users to switch between paired devices very easily.

In the described method, connection between the devices only happens if the signature authentication at each of the smart pen and a computing device is successful.

The advantages of this method are a decrease in the chance of someone being in the middle, snooping on the connection to unlock one of the devices. Another advantage is the smart pen is not dependent on one "parent" device. The smart pen can be unlocked irrespective of which computing device it ends up connecting to. This allows for the smart pen to connect and switch between multiple devices fast by just signing on a touchscreen or auxiliary input of a computing device. This process only takes approximately 1 to 10 seconds as opposed to the conventional method of pairing manually that takes 30-60 seconds.

A problem may arise if two people sign the same signature on two different devices, in an attempt to trick the system. The devices in the described method monitor more than just a signature picture. They also monitor the speed and way in which the person signs. Therefore a person that is faking a signature would need a lot of skill to mimic it. Furthermore, devices exchange a token during the pairing. This may ensure that both devices were signed at the same time or otherwise match. If there is a discrepancy in the tokens the pairing does not take place.

The described method involves two devices monitoring a single action at the same time in the form of the signature.

As noted initially, a smart pen for authentication for pairing with a computing device, as well as a computing device for authentication for pairing with a smart pen, are also provided herein. In addition, a computer program product carried out in a smart pen for authentication for pairing with a computing device, as well as a computer program product carried out at a computing device for authentication for pairing with a smart pen, are also provided. These aspects are summarized further below, and then discussed in greater detail with reference to FIGS. 4-7.

According to a further aspect of the present invention there is provided a smart pen for authentication for pairing with a computing device, the smart pen having a processor and a memory configured to provide computer program instructions to the processor to execute the function of the defined components, the smart pen including: an input system for sensing a signature event carried out by a user writing with the smart pen on an input user interface of the computing device; a signature event recording component for recording a signature resulting from the signature event; a signature authentication component for authenticating the signature by comparing the signature to a stored previously recorded signature at the smart pen; and a connection activation component for activating connection of the smart pen with the computing device using a communication channel if the authenticating is successful.

The smart pen may include a pairing verification component for, once connection is activated, carrying out a pairing procedure including exchanging signature data relating to the signature event and establishing pairing of the smart pen and the computing device if the exchanged signature data corresponds.

The signature event recording component may record metadata of the signature including static signing characteristics and/or dynamic signing characteristics and the signature authentication component compares the metadata to stored metadata of a previously recorded signature.

The connection activation component may include one or more of: an unlocking component for unlocking the smart pen, a communication channel activation component for switching on a communication channel at the smart pen, and a device identifying component for locating a reference to the computing device's communication channel.

The pairing verification component may include a signature data generating component for generating the signature data as an image of the signature or as data derived from static or dynamic characteristics of the signature.

The signature authentication component may compare the signature of the signature event a plurality of stored signatures for different computing devices and/or different users of the smart pen.

According to a further aspect of the present invention there is provided a computing device for authentication for pairing with a smart pen, the computing device having a processor and a memory configured to provide computer program instructions to the processor to execute the function of the defined components, the computing device comprising: a user interface for receiving a signature event carried out by a user writing with the smart pen on the user interface; a signature event recording component for recording a signature resulting from the signature event; a signature authentication component for authenticating the signature by comparing the signature to a stored previously recorded signature at the computing device; and a connection activation component for activating connection of the computing device with the smart pen using a communication channel if the authenticating is successful.

The computing device may include a pairing verification component for, once connection is activated, carrying out a pairing procedure including exchanging signature data relating to the signature event and establishing pairing of the smart pen and the computing device if the exchanged signature data corresponds.

The signature event recording component may record metadata of the signature including static signing characteristics and/or dynamic signing characteristics and the signature authentication component compares the metadata to stored metadata of a previously recorded signature.

The connection activation component may include one or more of: an unlocking component for unlocking the computing device, a communication channel activation component for switching on a communication channel at the computing device, and a device identifying component for locating a reference to the smart pen's communication channel.

The pairing verification component may include a signature data generating component for generating the signature data as an image of the signature or as data derived from static or dynamic characteristics of the signature.

The signature authentication component may compare the signature of the signature event a plurality of stored signatures for different smart pens and/or different users of the smart pen.

According to a still further aspect of the present invention there is provided a computer program product carried out at a smart pen for authentication for pairing with a computing device, the computer program product comprising a non-transient computer readable storage medium having program instructions embodied therewith, the program instructions executable by a processor to cause the processor to: sense a signature event carried out by a user writing with the smart pen on an input user interface of the computing device; record a signature resulting from the signature event; authenticate the signature by comparing the signature to a stored previously recorded signature at the smart pen; and wherein, if the authenticating is successful, activate connection of the smart pen with the computing device using a communication channel.

According to a still further aspect of the present invention there is provided a computer program product carried out at a computing device for authentication for pairing with a smart pen, the computer program product comprising a non-transient computer readable storage medium having program instructions embodied therewith, the program instructions executable by a processor to cause the processor to: receive a signature event carried out by a user writing with the smart pen on an input user interface of the computing device; record a signature resulting from the signature event; authenticate the signature by comparing the signature to a stored previously recorded signature at the computing device; and wherein, if the authenticating is successful, activate connection of the computing device with the smart pen using a communication channel.

Figure 4:
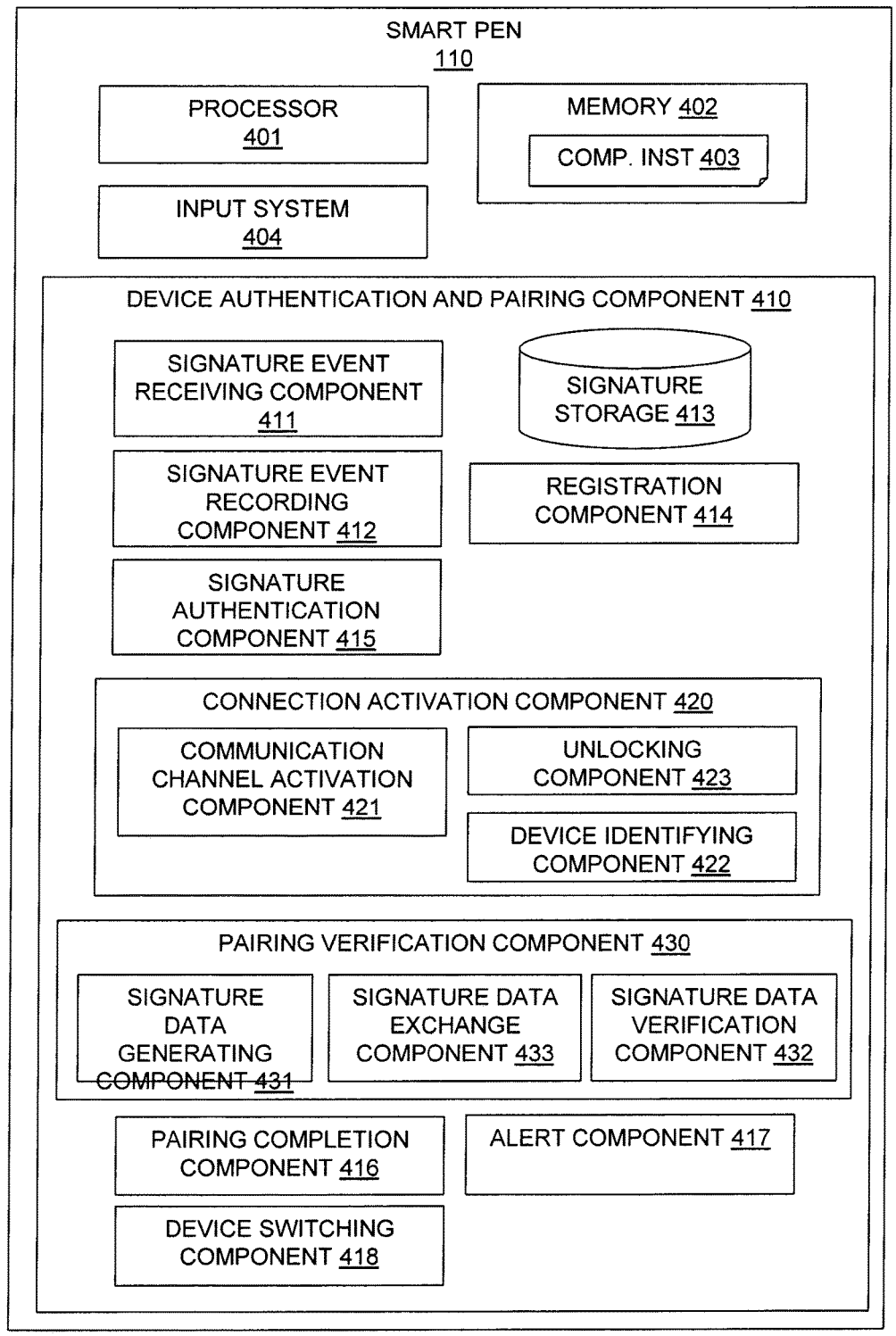
FIG. 4 is a block diagram of one embodiment of a smart pen, in accordance with one or more aspects of the present invention.
Figure 5:
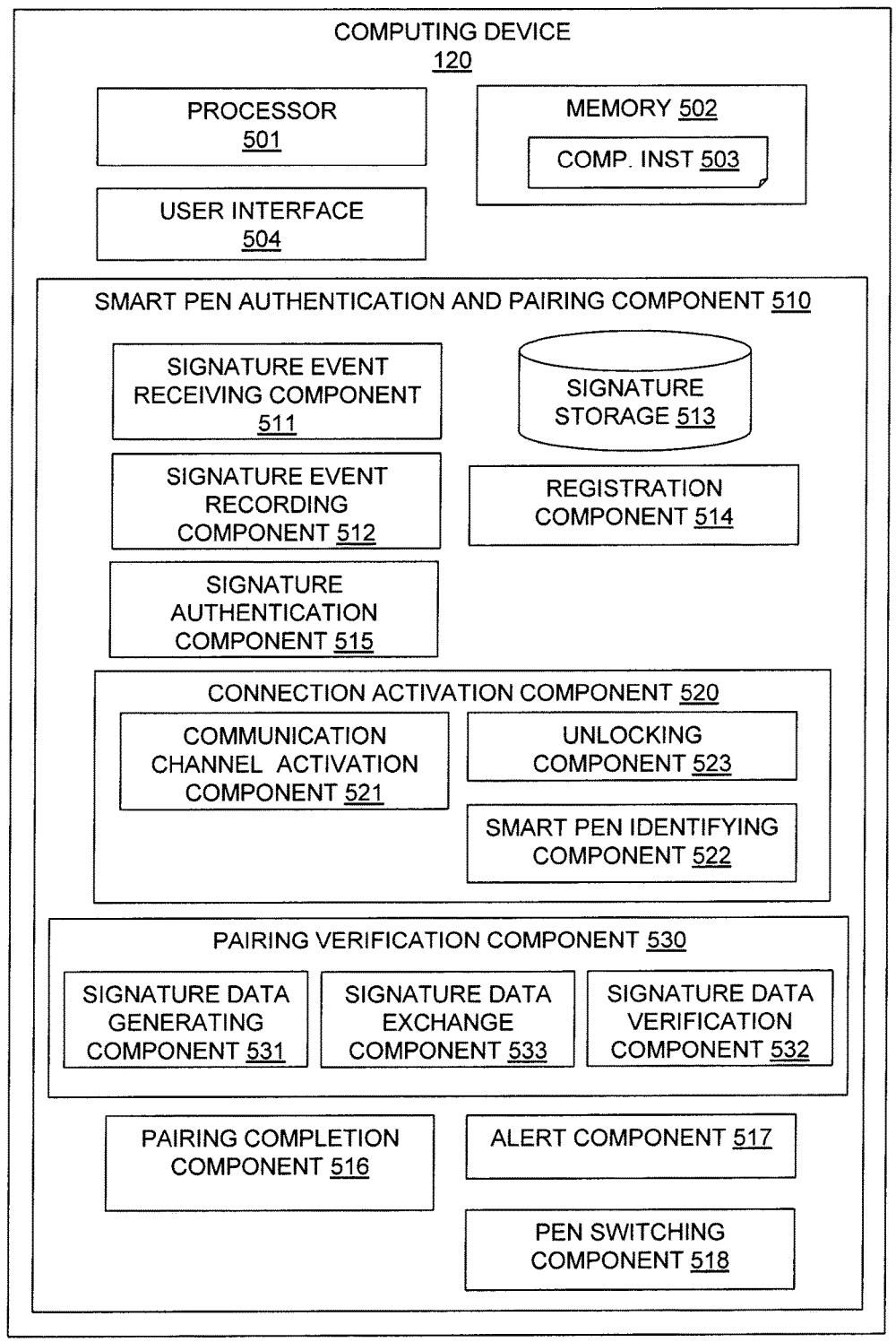
FIG. 5 is a block diagram of one embodiment of a computing device, in accordance with one or more aspects of the present invention

Referring to FIG. 4, a block diagram shows a smart pen 110 of the described system with functionality for authentication for connection with a computing device 120 as shown in FIG. 5.

The smart pen 110 may include a processor 401, a hardware module, or a circuit for executing the functions of the described components which may be software units executing on the at least one processor. Memory 402 may be configured to provide computer instructions 403 to the at least one processor 401 to carry out the functionality of the components. The smart pen 110 may be any form of smart pen 110 known in the art with additional functionality of authentication and pairing as described herein. A generic smart pen 110 is described further in relation to FIG. 6.

The smart pen 110 may include an input system 404 for sensing writing with the pen by a user including signature events on an input user interface of a computing device. A signature event may be signature event signs a name, writes a word or phrase, or draws a picture. The input system 404 may include multiple sensors to sense the user action of the smart pen 110.

A device authentication and pairing component 410 may be provided at the smart pen 110 for pairing with a computing device via a communication channel. This may be in the form of computer instructions installed in the smart pen 110 either at manufacture or as a subsequently downloaded application.

The device authentication and pairing component 410 may include a signature event receiving component 411 for receiving information regarding a signature event from the input system 404 of the smart pen 110. There may be a user input that indicates to the device authentication and pairing component 410 that a signature event is taking place as opposed to other writing operation of the smart pen 110 or this may be a first input made with the smart pen 110 after a dormant phase. The device authentication and pairing component 410 may include a signature event recording component 412 for recording a signature resulting from the signature event and a signature storage 413 may be provided for storing such signatures. The signature event recording component 412 may record metadata of the signature including signing characteristics and/or an image of the signature.

The device authentication and pairing component 410 may include a registration component 414 for recording and storing a first use of a signature carried out by a user writing with the smart pen 110 on an input user interface of a computing device. The registration component 410 may require additional user verification at the smart pen 110 such as an administrator password.

The signature storage 413 may include a plurality of stored signatures for different computing devices and/or different users of the smart pen 110. Each of the plurality of stored signatures may reference a computing device and a communication channel of the computing device.

The device authentication and pairing component 410 may include a signature authentication component 415 that compares the signature of a current signature event to one or more stored signatures in the signature storage 413. The signature authentication component 415 compares the metadata of a signature to stored metadata of a previously recorded signature in order to find or confirm a substantial match. This comparison may use pattern matching or other appropriate techniques to match the signatures.

The device authentication and pairing component 410 may include a connection activation component 420 for activating a communication channel of the smart pen 110 if the authentication by the signature authentication component 415 is successful. The connection activation component 420 may include a communication channel activation component 421 for switching on a communication channel at the smart pen 110 and a device identifying component 422 for locating a reference to the computing device's communication channel. The connection activation component 420 may also include an unlocking component 423 for unlocking the smart pen 110 if the authentication by the signature authentication component 415 is successful.

The device authentication and pairing component 410 may include a pairing verification component 430 for exchanging signature data relating to the signature event and only accepting pairing if the exchanged signature data corresponds. The pairing verification component 430 includes a signature data generating component 431 for generating the signature data as is an image of the signature or as data derived from metadata of the signature, which may include a timestamp of the signature event.

The pairing verification component 430 may include a signature data exchange component 433 for sending first signature data derived from the signature event to the computing device and receiving second signature data from the computing device. The pairing verification component 430 may include a signature data verification component 432 for comparing the first and second signature data to ensure they relate to a single signature event.

In one embodiment, the first signature data may be a timestamp of the signature event at the smart pen 110 and the second signature data may be a timestamp of the signature event at the computing device, and the signature data verification component 432 may compare the first and second signature data to ensure the timestamps are within a defined time period.

The device authentication and pairing component 410 may also include a pairing completion component 416 for finalizing a pairing process of the smart pen 110 with a computing device 120, and an alert component 417 for indicating to the user of the smart pen 110 that a pairing has succeeded or failed. The device authentication and pairing component 410 may also include a device switching component 418 for receiving and recognizing a new signature event at the smart pen 110 indicating an intended pairing with another computing device 120. The device switching component 418 may prompt a new authentication and pairing process.

Referring to FIG. 5, a block diagram shows a computing device 120 of the described system with functionality for authentication for connection with a smart pen 110, such as shown in FIG. 4.

The computing device 120 may include a processor 501, a hardware module, or a circuit for executing the functions of the described components which may be software units executing on the at least one processor. Memory 502 may be conFIG.d to provide computer instructions 503 to the at least one processor 501 to carry out the functionality of the components. The computing device 120 may be any form of computing device 120 capable of interacting with a smart pen 110 with additional functionality of authentication and pairing as described herein. A generic computing device 120 is described further in relation to FIG. 7.

The computing device 120 may include a user interface 504 for receiving input of writing with a smart pen by a user. The user interface 504 may be, for example, a touchscreen interface or auxiliary input device with a receiving pad. The user interface 504 may receive a signature event in the form of input of a name, a word or phrase, or a picture.

A device authentication and pairing component 510 may be provided at the computing device 120 for pairing with a smart pen via a communication channel, which may be in the form of computer instructions installed on the computing device 120.

The device authentication and pairing component 510 may include a signature event receiving component 511 for receiving information regarding a signature event from the user interface 504 of the computing device 120. There may be a user input that indicates to the device authentication and pairing component 510 that a signature event is taking place. The device authentication and pairing component 510 may include a signature event recording component 512 for recording a signature resulting from the signature event and a signature storage 513 may be provided for storing such signatures. The signature event recording component 512 may record metadata of the signature including signing characteristics and/or an image of the signature as recorded by the user interface 504.

The device authentication and pairing component 510 may include a registration component 514 for recording and storing a first use of a signature carried out by a user writing with a smart pen on the user interface 504 of the computing device 120. The registration component 510 may require additional user verification at the computing device 120, such as an administrator password.

The signature storage 513 may include a plurality of stored signatures for different smart pens and/or different users of smart pens and/or different users of the computing device 120. Each of the plurality of stored signatures may reference a smart pen or user and a communication channel of a referenced smart pen.

The device authentication and pairing component 510 may include a signature authentication component 515 that compares the signature of a current signature event to one or more stored signatures in the signature storage 513. The signature authentication component 515 compares the metadata of a signature to stored metadata of a previously recorded signature in order to find or confirm a substantial match. This comparison may use pattern matching or other appropriate techniques to match the signatures.

The device authentication and pairing component 510 may include a connection activation component 520 for activating a communication channel of the computing device 120 if the authentication by the signature authentication component 515 is successful. The connection activation component 520 may include a communication channel activation component 521 for switching on a communication channel at the computing device 120 and a smart pen identifying component 522 for locating a reference to the smart pen's communication channel. The connection activation component 520 may also include an unlocking component 523 for unlocking the computing device 110 if the authentication by the signature authentication component 415 is successful.

The device authentication and pairing component 510 may include a pairing verification component 530 for exchanging signature data relating to the signature event and only accepting pairing if the exchanged signature data corresponds. The pairing verification component 530 may include a signature data generating component 531 for generating the signature data as is an image of the signature or as data derived from metadata of the signature, which may include a timestamp of the signature event.

The pairing verification component 530 may include a signature data exchange component 533 for sending second signature data derived from the signature event to the smart pen and receiving first signature data from the smart pen. The pairing verification component 530 may include a signature data verification component 532 for comparing the first and second signature data to ensure they relate to a single signature event.

In one embodiment, the first signature data may be a timestamp of the signature event at the smart pen and the second signature data may be a timestamp of the signature event at the computing device, and the signature data verification component 532 may compare the first and second signature data to ensure the timestamps are within a defined time period.

The device authentication and pairing component 510 may also include a pairing completion component 516 for finalizing a pairing process of the computing device 120 with a smart pen 110, and an alert component 517 for indicating to the user of the computing device 120 that a pairing has succeeded or failed. The device authentication and pairing component 510 may also include a pen switching component 518 for receiving and recognizing a new signature event at the computing device 120 indicating an intended pairing with another smart pen 110. The pen switching component 518 may prompt a new authentication and pairing process.

Figure 6:
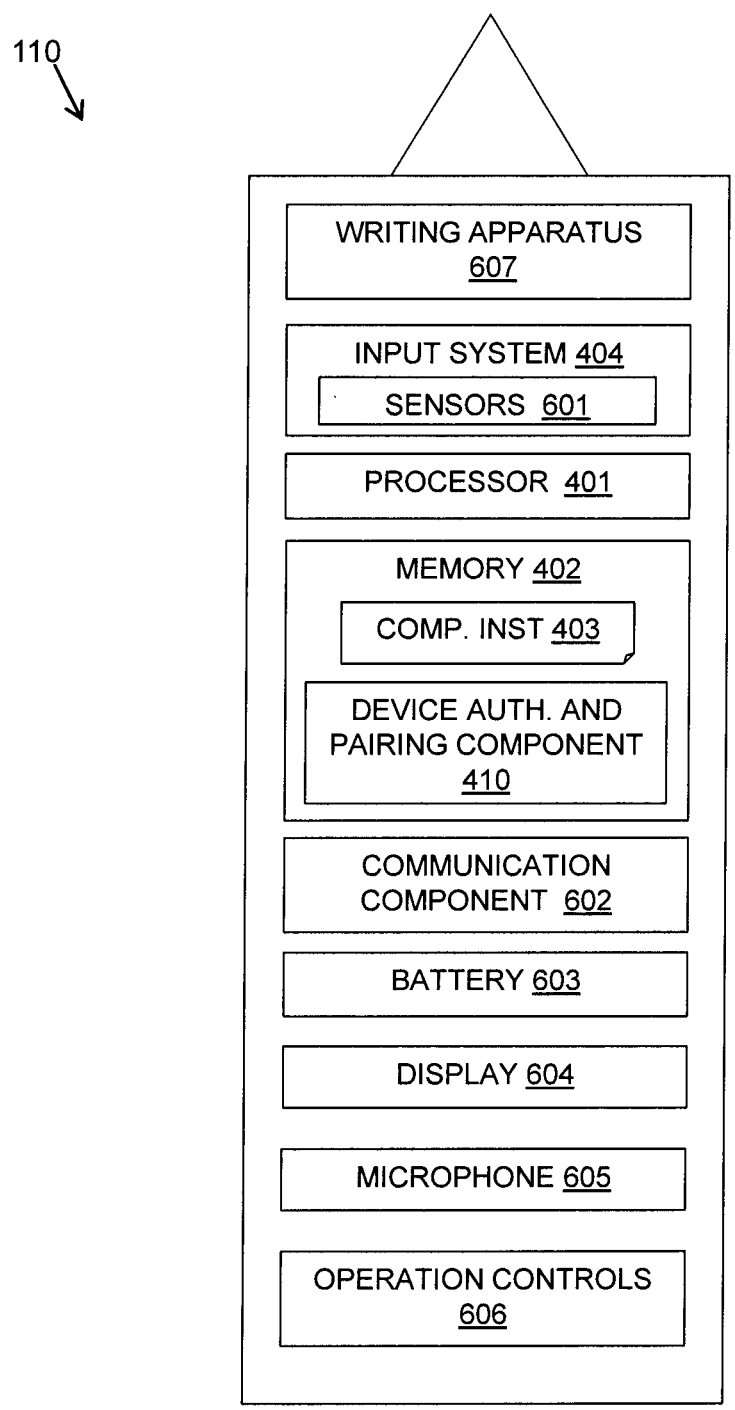
FIG. 6 is a block diagram of one embodiment of a general smart pen, in which one or more aspects of the present invention may be implemented.

FIG. 6 shows a block diagram of a smart pen 110 that may be used in embodiments of the disclosure.

The smart pen 110 may include a writing apparatus 607 for marking or recording on a paper or other surface. An input system 404 may be provided with multiple sensors 601 which may sense inputs made by the user of the smart pen 110 when writing or drawing with the smart pen 110. Sensors 601 may include optical sensors, movement sensors, pressure sensors, position sensors, etc.

The smart pen 110 may include a battery 603, display 604, microphone 605, and operation controls 606.

The smart pen 110 may include a processor 401 (e.g., a microprocessor) for processing the functions of the smart pen 110. The processor 401 of the smart pen 110 may connect to a memory 402. The memory 402 may be in the form of a computer-readable medium that stores data and computer-executable instructions 403.

The memory 402 may include a device authentication and pairing component 410 providing the functionality described herein.

The smart pen 110 may also include a communication component 602 for connection to communication channels using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication component 602 and an interrogation device such as the computing device 120. Bluetooth is a wireless technology standard for exchanging data over short distances (using short-wavelength UHF radio waves in the ISM band from 2.4 to 2.485 GHz) Visual Light Communication and WiFi may also be used as communication channels of the communication component 602.

Figure 7:
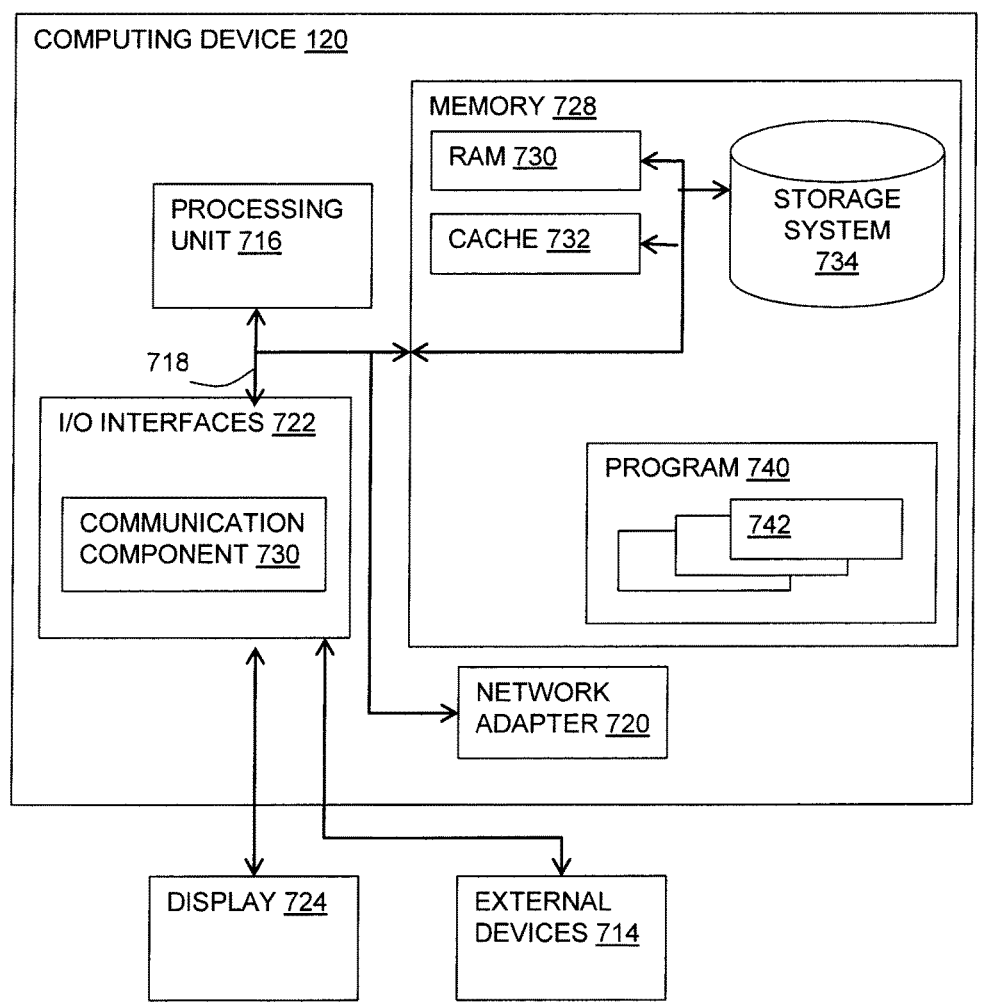
FIG. 7 is a block diagram of one embodiment of a general computing device, in which one or more aspects of the present invention may be implemented.

Referring now to FIG. 7, a schematic of an example of a computing device 120 is shown.

A computing device 120 may be operational with numerous other general purpose or special purpose computing system environments or configurations. Examples of well-known computing systems, environments, and/or configurations that may be suitable for use with the computing device 120 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

A computing device 120 may be described in the general context of computer system-executable instructions, such as program modules, being executed by a computer system. Generally, program modules may include routines, programs, objects, components, logic, data structures, and so on that perform particular tasks or implement particular abstract data types.

In FIG. 7, a computing device 120 is shown in the form of a general-purpose computing device. The components of the computing device 120 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A computing device 120 typically includes a variety of computer system readable media. Such media may be any available media that is accessible by computing device 120, and it includes both volatile and non-volatile media, removable and non-removable media.

System memory 728 can include computer system readable media in the form of volatile memory, such as random access memory (RAM) 730 and/or cache memory 732. Computing device 120 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are conFIG.d to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

A computing device 120 may also communicate with one or more external devices 714 such as a keyboard, a pointing device, a display 724, etc.; one or more devices that enable a user to interact with computing device 120; and/or any devices (e.g., network card, modem, etc.) that enable computing device 120 to communicate with one or more other computing devices. Such communication can occur via Input/Output (I/O) interfaces 722. Still yet, computing device 120 can communicate with one or more networks such as a local area network (LAN), a general wide area network (WAN), and/or a public network (e.g., the Internet) via network adapter 720. As depicted, network adapter 720 communicates with the other components of computing device 120 via bus 718. It should be understood that although not shown, other hardware and/or software components could be used in conjunction with computing device 120. Examples, include, but are not limited to: microcode, device drivers, redundant processing units, external disk drive arrays, RAID systems, tape drives, and data archival storage systems, etc.

The computing device 120 may include a communication component 730 which is capable of communication with the communication component 602 of the smart pen 110. The communication component 730 may enable connection to communication channels using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication component 602 and an interrogation device such as the computing device 120. Bluetooth is a wireless technology standard for exchanging data over short distances (using short-wavelength UHF radio waves in the ISM band from 2.4 to 2.485 GHz). Visual Light Communication and WiFi may also be used as communication channels of the communication component 730.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIG.s illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIG.s. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for pairing a smart pen with a computing device, comprising:
   sensing by the smart pen a signature event carried out by a user writing with the smart pen on an input user interface of the computing device;
   recording and saving a signature at the smart pen resulting from the signature event;
   authenticating by the smart pen the signature by comparing the signature to a stored previously recorded signature at the smart pen; and
   wherein, based on the authenticating being successful, activating at the smart pen connection of the smart pen with the computing device using a communication channel.

2. The method as claimed in claim 1, further comprising, once connection is activated, carrying out a pairing procedure including exchanging signature data relating to the signature event and establishing pairing of the smart pen and the computing device based on the exchanged signature data corresponding.

3. The method as claimed in claim 2, wherein exchanging signature data sends first signature data derived from the signature event to the computing device and receives second signature data from the computing device, and wherein the method further includes comparing the first and second signature data to ensure they relate to a single signature event.

4. The method as claimed in claim 3, wherein the first signature data includes a timestamp of the signature event at the smart pen and the second signature data includes a timestamp of the signature event at the computing device, and comparing the first and second signature data verifies the timestamps are within a defined time period.

5. The method as claimed in claim 3, wherein the first signature data is an image of the signature or is data derived from metadata of the signature.

6. The method as claimed in claim 1, wherein recording the signature records metadata of the signature including at least one of static signing characteristics or dynamic signing characteristics, and authenticating the signature compares the metadata to stored metadata of a previously recorded signature.

7. The method as claimed in claim 1, wherein activating connection includes an action selected from the group consisting of: unlocking the smart pen, switching on a communication channel at the smart pen, and locating a reference to the computing device's communication channel.

8. The method as claimed in claim 1, further comprising a registration process for recording and storing a signature at the smart pen carried out by a user writing with the smart pen on the input user interface of the computing device.

9. The method as claimed in claim 1, wherein authenticating the signature by comparing to a stored previously recorded signature at the smart pen substantially matches the signature to one of a plurality of stored signatures for at least one of different computing devices or different users of the smart pen.

10. The method as claimed in claim 1, wherein the signature event signs a graphic input of the user in the form of one or a combination of the group of: a name, a word, a phase, a string of characters, and a drawn graphic.

11. The computer-implemented method of claim 1, further comprising:
    sensing by the computing device the signature event carried out by the user writing with the smart pen on the input user interface of the computing device;
    recording and saving the signature at the computing device resulting from the signature event;
    authenticating by the computing device the signature by comparing the signature to a stored previously recorded signature at the computing device; and
    wherein, based on the authenticating being successful, activating at the computing device connection of the computing device with the smart pen using the communication channel.

12. The method as claimed in claim 11, further comprising, once connection is activated, carrying out a pairing procedure including exchanging signature data relating to the signature event and establishing pairing of the smart pen and the computing device based on the exchanged signature data corresponding.

13. The method as claimed in claim 12, wherein exchanging signature data sends second signature data derived from the signature event to the smart pen and receives first signature data from the smart pen, and wherein the method further includes comparing the first and second signature data to ensure they relate to a single signature event.

14. The method as claimed in claim 11, wherein activating connection includes an action selected from the group consisting of: unlocking the smart pen, switching on a communication channel at the computing device, and locating a reference to the smart pen's communication channel.

15. The method as claimed in claim 11, wherein authenticating the signature by comparing to a stored previously recorded signature at the computing device substantially matches the signature to one of a plurality of stored signatures for at least one of different smart pens or different users of the smart pen.

16. The method as claimed in claim 11, including receiving a second signature event and carrying out the method of claim 11 to change a connection to a second smart pen.

* * * * *